(12) United States Patent
Kim

(10) Patent No.: US 10,228,768 B2
(45) Date of Patent: Mar. 12, 2019

(54) OPTICAL USER INTERFACE

(71) Applicant: ANALOG DEVICES, INC., Norwood, MA (US)

(72) Inventor: Young Han Kim, Andover, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 42 days.

(21) Appl. No.: 15/022,370

(22) PCT Filed: Mar. 25, 2015

(86) PCT No.: PCT/US2015/022357
§ 371 (c)(1),
(2) Date: Mar. 16, 2016

(87) PCT Pub. No.: WO2015/148591
PCT Pub. Date: Oct. 1, 2015

(65) Prior Publication Data
US 2016/0231824 A1 Aug. 11, 2016

Related U.S. Application Data

(60) Provisional application No. 61/970,273, filed on Mar. 25, 2014.

(51) Int. Cl.
*G06F 3/01* (2006.01)
*G06F 1/16* (2006.01)
(Continued)

(52) U.S. Cl.
CPC .............. *G06F 3/017* (2013.01); *G06F 1/169* (2013.01); *G06F 1/1626* (2013.01); *G06F 3/005* (2013.01); *G06F 3/0304* (2013.01)

(58) Field of Classification Search
CPC ........ G06F 3/017; G06F 1/1626; G06F 1/169; G06F 3/005; G06F 3/0304
(Continued)

(56) References Cited

U.S. PATENT DOCUMENTS 7,653,883 B2 1/2010 Hotelling et al.
8,421,752 B2 4/2013 DeLuca
(Continued)

FOREIGN PATENT DOCUMENTS

WO 2014/008939 1/2014
WO 2015/148591 10/2015

OTHER PUBLICATIONS

International Search Report and Written Opinion for PCT/US2015/022357 dated Jun. 25, 2015, 7 pages.

*Primary Examiner* — Mark Regn
(74) *Attorney, Agent, or Firm* — Patent Capital Group

(57) ABSTRACT

In an example, a system for detecting an object in an area over a screen of a mobile device may comprise a light source and a photodetector tilted toward the screen. Since a field of view of the photodetector and a radiation field of the light source may be directed toward the screen, the system may detect that a user performed a non-contacting gesture in the area over the screen. In another example, a system for detecting multiple modes of finger gestures may detect at least one of a signature gesture, a thumb joystick mode, or a thumb mouse mode. The system can execute a calendar application upon detecting that a user gestured in the shape of a letter "C". When detecting a thumb gesture, the system may utilize a sensor having a reduced range relative to the range needed for hand gestures and, thereby, reduce power consumption.

18 Claims, 6 Drawing Sheets

(51) Int. Cl.
*G06F 3/03* (2006.01)
*G06F 3/00* (2006.01)

(58) Field of Classification Search
USPC .......................................................... 345/156
See application file for complete search history.

(56) References Cited

U.S. PATENT DOCUMENTS

| | | |
|---|---|---|
| 2007/0120996 A1* | 5/2007 | Boillot .................... G06F 3/017 348/345 |
| 2011/0291988 A1* | 12/2011 | Bamji .................... G06F 3/0428 345/175 |
| 2011/0312349 A1 | 12/2011 | Forutanpour et al. |
| 2012/0016641 A1 | 1/2012 | Raffa et al. |
| 2012/0120029 A1 | 5/2012 | McCarthy et al. |
| 2012/0274547 A1 | 11/2012 | Raeber et al. |
| 2012/0306770 A1 | 12/2012 | Moore et al. |
| 2013/0155237 A1* | 6/2013 | Paek .................... G06F 1/1632 348/148 |
| 2013/0218729 A1 | 8/2013 | Cranfill et al. |
| 2013/0293454 A1 | 11/2013 | Jeon et al. |

* cited by examiner

OPTICAL USER INTERFACE

CROSS-REFERENCE TO RELATED APPLICATION

This application claims the benefit of and priority to U.S. Provisional Patent Application No. 61/970,273 filed 25 Mar. 2014 entitled "OPTICAL USER INTERFACE", which is incorporated herein by reference in its entirety.

TECHNICAL FIELD OF THE DISCLOSURE

The present disclosure relates generally to user input devices and, more particularly, to using an optical position sensor to detect hand, finger, and/or thumb gestures.

BACKGROUND

Modern devices include various systems for user input. For example, a smartphone (phone) can include hardware such as accelerometers, digital cameras, capacitive sensors, touchscreens, proximity sensors, etc. for use by such user input systems. A proximity sensor can include a light source and a photodetector. The light source emits light, which can be reflected from a surface of an object proximate to the light source. The photodetector detects the reflected light and can output a voltage or current corresponding to an intensity of light. Proximity sensors are often located at a top of a face of the phone to correspond to the location on the phone at which a user would place their ear while engaged in a voice call. If the proximity sensor detects that the user's ear is near the sensor, a touchscreen on the phone can be temporarily disabled to prevent unintentionally pressing (e.g., by the user's ear or cheek while the user is on a voice call) buttons on the touchscreen surface and can turn off a display reduce power consumption.

An increase in the complexity of applications for mobile devices has led to a corresponding increase in a need for more options for user input. However, the limited resources available to mobile devices has further led to existing hardware being used to provide multiple modes of user input instead of being used to provide a single mode of user input. For example, output from a digital camera may be used as input to control video games and as input to detect a user's heart rate.

For proximity sensors (e.g., using a photodetector), one approach for providing multiple modes of user input has been to use the sensors to detect both boolean proximity (i.e., whether a user's ear is near the phone or not) and gesture data (e.g., a user swiping their hand from left to right through the sensor's field of view and not contacting the phone with the swiping hand).

However, a challenge with using a proximity sensor to detect gesture data is that a field of view of the proximity sensor often does not coincide with the area where a user is likely to perform a gesture. Moreover, the sensor may not provide position data needed for gesture detection. Furthermore, a proximity sensor—a light source and a photodetector—is often located at the top of the face of the phone and has a relatively narrow field of view, which does not coincide with the area above the phone's screen. An average user is not aware of the location of the proximity sensor and therefore is likely to perform gestures over the area above the phone's screen and not within the field of view of the proximity sensor. Even if the user is aware that a proximity sensor is located at top of the phone, the user may not find it intuitive to perform a gesture at the top of the screen since, e.g., the user may be accustomed to interacting with a touchscreen on the phone. In addition, increasing the field of view and range of the proximity sensor (e.g., increasing the field of view of the photodetector and increasing the angle of illumination and range of the light source) to coincide with the area above the screen may cause the proximity sensor to consume a prohibitively large amount of power. Such an approach is analogous to turning on all of the lights in a large room to merely illuminate an object of interest, e.g., a book. While it is clear the turning on all of the lights in the room may illuminate the object of interest, it may also illuminate objects that are not of interest and therefore waste resources. Using this analogy, there is a need for a solution that can illuminate the object of interest without turning on all of the lights in the room. Correspondingly, there is a need for a solution to enable detecting a gesture over a screen (e.g., which may not be centered over the photodetector of the proximity sensor) while efficiently using power resources.

For a photodetector, detecting more than a boolean proximity (i.e., whether a user's ear is near the phone or not) becomes increasing challenging as the precision with which to track the proximity of an object increases. For example, merely detecting whether a user's ear is near a phone or may require less power and computation resources than continuously outputting a distance between an object (e.g., a user's hand) and the proximity sensor. Accordingly, there is a need for a gesture input system with flexibility to adjust an input mode, and the corresponding power and computation consumption, based on the nature of the input needed for a particular task.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Optical Gesture System Having Tilted Angle of View

A light source and a position sensor can be implemented either as independent components on a mobile device or combined into a module integrating the light source and the position sensor. The position sensor may comprise at least one photodiode (e.g., an array of two photodiodes). The field of view of a gesture system is based, in part, on the field of view of the position sensor and the radiation field of the light source. For example, the field of view of the gesture system may be an area (or volume) of overlap between the field of view of the position sensor and the radiation field of the light source since this is the area (or volume) where an object would be illuminated by the light source and detected by the position sensor thereby enabling gesture detection. Some factors affect both the field of view of the position sensor and the radiation field of the light source. For example, the light source and the position sensor may be mounted on a flexible printed circuit board (PCB) or a rigid PCB. The way in which the position sensor and/or light source are mounted on a PCB may affect the field of view of the position sensor and/or the radiation field of the light source, respectively.

Figure 1A:
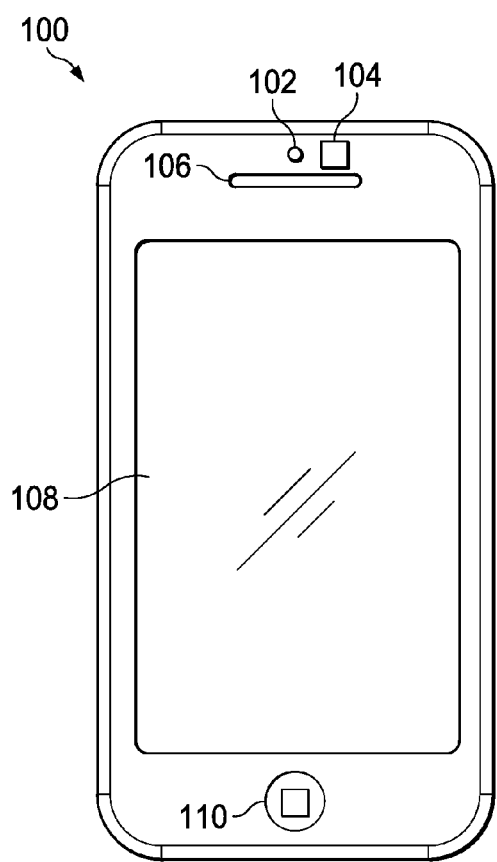
FIGS. 1A, 1B, and 1C are simplified schematic diagrams illustrating a mobile device according to some embodiments of the present disclosure.
Figure 1B:
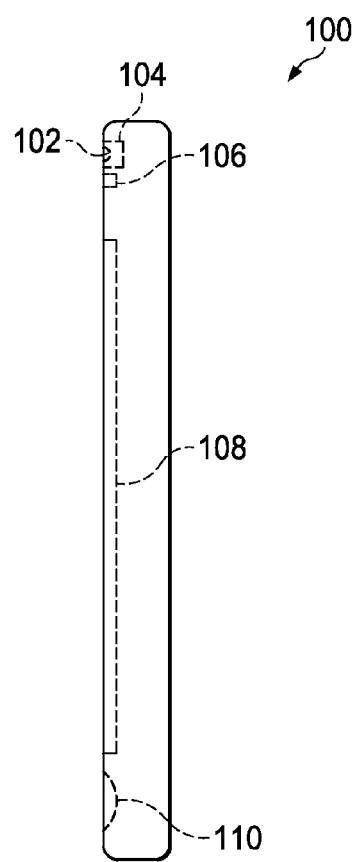
Figure 1C:
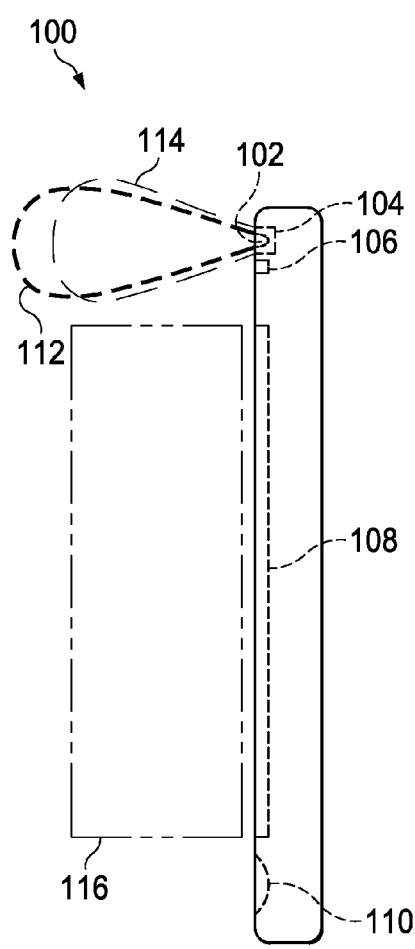

FIGS. 1A, 1B, and 1C illustrate a smartphone configured with a light source and a sensor. System 100 comprises light source 102, sensor 104, speaker 106, screen 108, button 110, light source radiation field 112, sensor field of view 114, and an area over screen 116. FIG. 1A illustrates a front face of the smartphone while FIGS. 1B and 1C illustrate a side view of the smartphone. In system 100, the light source 102 the sensor 104, and the speaker 106 are located at the top of the front face of the smartphone. The screen 108 is located near the middle of the smartphone. The button 104 is located at the bottom of the front face of the smartphone.

In an implementation, light source 102 may be a light emitting diode. The light provided by light source may be in a visible or invisible spectrum of light. For example, light source 102 may be an infrared light emitting diode. In an implementation, sensor 104 may be a photodetector, a photodiode, a position sensor, or an array of photodetector. Screen 108 may be a touchscreen, e.g., for providing touch-based user input. The button 110 is operable to receive user input (e.g., may be depressed or pushed by a user to provide input). The speaker 106 provides audio output (e.g., voice data from a voice call, music from an music application, and the like).

FIG. 1C illustrates the relationship between the sensor field of view 114, the light source radiation field 112, and the area over the screen 116. Sensor 104 detects light within sensor field of view 114. Light source 102 emits light within light source radiation field 112. The sensor field of view 114 and the light source radiation field 112 are oriented perpendicular to the front face of the smartphone. In FIG. 1C, each of the light source radiation field 112 and sensor field of view 114 are illustrated as two-dimensional fields. However, it is understood by those of skill in the art that the fields may correspond to three dimensional volumes. In this example, the light source radiation field 112 and the sensor field of view 114 overlap one another but neither coincides with any portion of the area over the screen 116. Consequently, if a user performs a gesture (e.g., a non-contacting hand gesture and/or non-contacting thumb/finger gesture) in the area over the screen 116, then a gesture system using sensors 104 and light source 102 may not detect the gesture.

A solution is to provide an optical gesture system comprising a position sensor (e.g., more than one photodiode) having a field of view (FOV) and a light source (e.g., an infrared LED) having a radiation field, wherein each of the FOV of the position sensor and the radiation field of the light source cover an area over the screen of the phone. In an implementation, the position sensor may have a wide angle of view (e.g., +/−60 degrees) and the radiation field of the light source may be provided at an angular offset relative to a line perpendicular to a face of a mobile device. Alternatively, each of the FOV of the position sensor and the radiation field of the light source are provided at an angular offset relative to a line perpendicular to a face of a mobile device. Advantageously, a gesture system using such an angular offset (e.g., for the FOV of the position sensor and/or the radiation field of the light source) may allow the system to detect gestures while also reducing the power consumption relative to that required for merely increasing the angle of view of the system. Returning to the analogy above, such a system is analogous to directing a light onto an object of interest instead of merely turning on all of the lights in a room. Tilting the field of view of the gesture system (e.g., the FOV position sensor and/or the radiation field of the light source) toward an area where a user is likely to gesture (e.g., the area over the screen) is an approach for detecting gestures over the screen while efficiently utilizing power and computational resources. The gesture system can detect position data (e.g., coordinates) for an object in a FOV of the system; the gesture system can process the position data to determine gesture information. It is noted that the terms "position data" and "gesture data" are used interchangeably throughout the present disclosure.

Parameters to specify the size and/or shape of a radiation field of the light source may be predetermined for a specific application. Parameters may include, e.g., a maximum radiation distance associated with a radiation field or associated with a corresponding radiation volume. For example, a narrow angle of spread for the radiation field may be utilized to achieve a longer range and/or for detecting a simple gesture such as a hand swipe or a finger swipe; a wide angle of spread for the radiation field may be utilized for detecting more complicated gesture sets beyond simple swiping. A field of view of a position sensor may be selected, in part, to maximize the efficiency and angular coverage for position tracking.

Figure 2:
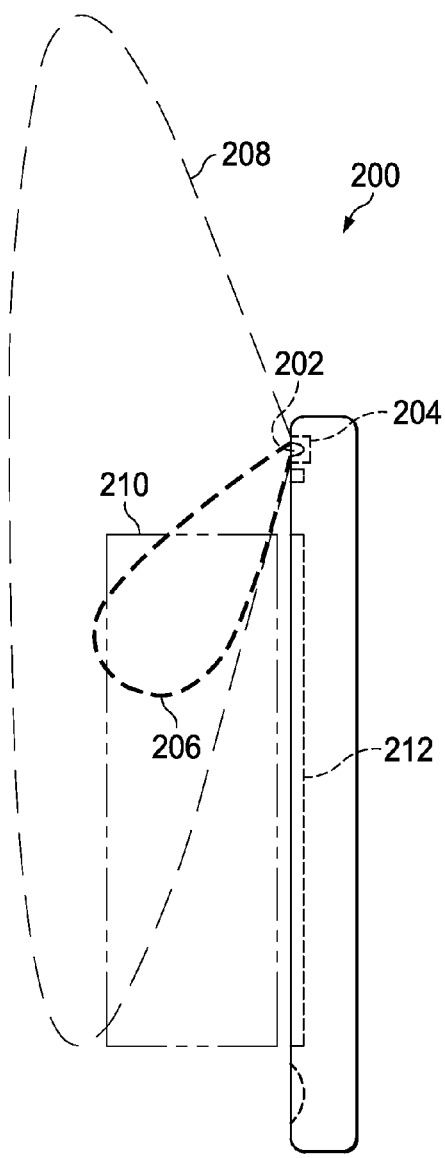
FIGS. 2, 3, and 4 illustrate exemplary configurations of sensors and light sources on a mobile device according to some embodiments of the present disclosure.

Some position sensors have a wide angle of view (e.g., +/−60 degrees, or 120 degree total angle of view). For example, U.S. patent application Ser. No. 13/329,510, filed Dec. 19, 2011, titled "Optical measuring sensor", which is herein incorporated by reference in its entirety, describes a sensor, which may have a large field of view, for determining the position of or tracking movement of an object. A gesture system according to the present disclosure may comprise such a position sensor (e.g., having a wide angle of view) and a light source tilted toward a screen on a mobile device. For example, FIG. 2 illustrates a side view of a smartphone comprising a light source and a sensor according to an embodiment of the present disclosure, similar to the side view shown in FIG. 1B. System 200 comprises sensor 204, light source 202, radiation field 206, field of view 208, screen 212, and area over screen 210. The components are placed at locations on a front face of the smartphone similar to the locations shown in system 100. Sensor 204 detects light within the field of view 208. Light source 202 emits light within the radiation field 206. The field of view 208 is oriented perpendicular to the front face of the smartphone. The radiation field 206 is tilted toward screen 212 and therefore overlaps the corresponding area over the screen 210.

Unlike system 100, system 200 comprises a sensor 204 and a light source 202 having corresponding sensor field of view 208 and light source radiation field 206, respectively, which overlap one another and also overlap the area over the screen 210. Due to the enlarged angular spread of the field of view 208 (e.g., relative to the field of view 114), the field of view 208 overlaps the area over the screen 210. The radiation field 206 is of a similar size as is shown in FIG. 1. In addition, the radiation field 206 is tilted toward screen 212 and therefore overlaps the corresponding area over the screen 210. Since the field of view 208 and the radiation field 206 overlap the area over the screen 210, a gesture system using sensor 204 and light source 202 may detect that a user performed a gesture in the area over the screen 210.

In FIGS. 1C and 2, each of the radiation fields 112 and 206 and fields of view 114 and 208 are illustrated as two-dimensional fields. However, it is understood by those of skill in the art that the fields may correspond to three dimensional volumes.

In an implementation, the field of view 208 has an angular spread of plus or minus 60 degrees relative to a line that is perpendicular to the surface of the front face of the smartphone (e.g., and originating at a center point of the sensor 204). Thus, the total angular spread for the field of view may be 120 degrees. In an alternate implementation, the total angular spread may be greater than 120 degrees. In another implementation, the total angular spread may be less than 120 degrees. Light source radiation field 206 may have an angular spread of plus or minus 25 degrees (e.g., measured about a centerline of the radiation field).

Figure 3:
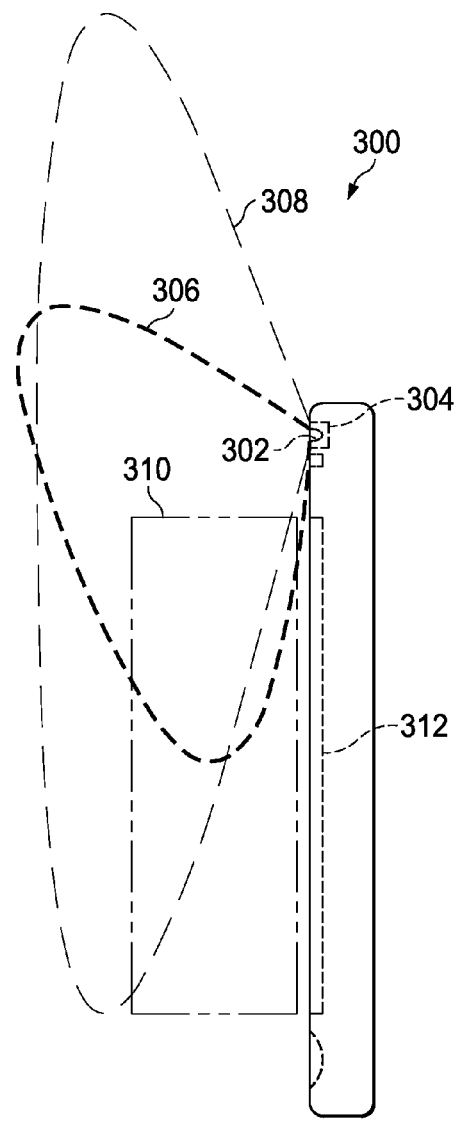

FIG. 3 illustrates a side view of a smartphone comprising a light source and a sensor according to an embodiment of the present disclosure. The components illustrated in FIG. 3 are similar to those in FIG. 1B and FIG. 2. Sensor 304 detects light within a field of view 308. Light source 302 emits light within a radiation field 306. The field of view 308 is oriented perpendicular to the front face of the smartphone. The radiation field 306 is tilted toward screen 312 and therefore overlaps the area over the screen 310. The radiation field 306, in FIG. 3 is larger than the radiation field 206, in FIG. 2. The enlarged light source radiation field provides a larger area in which to detect a gesture. For example, a user's hand may tend to move away from the screen while performing a swiping gesture from a bottom to a top of the face of the smartphone. The increased illumination may allow the system to detect gesture data in an enlarger area (e.g., enabling detection of gesture data even while the user's hand moves away from the phone).

Figure 4:
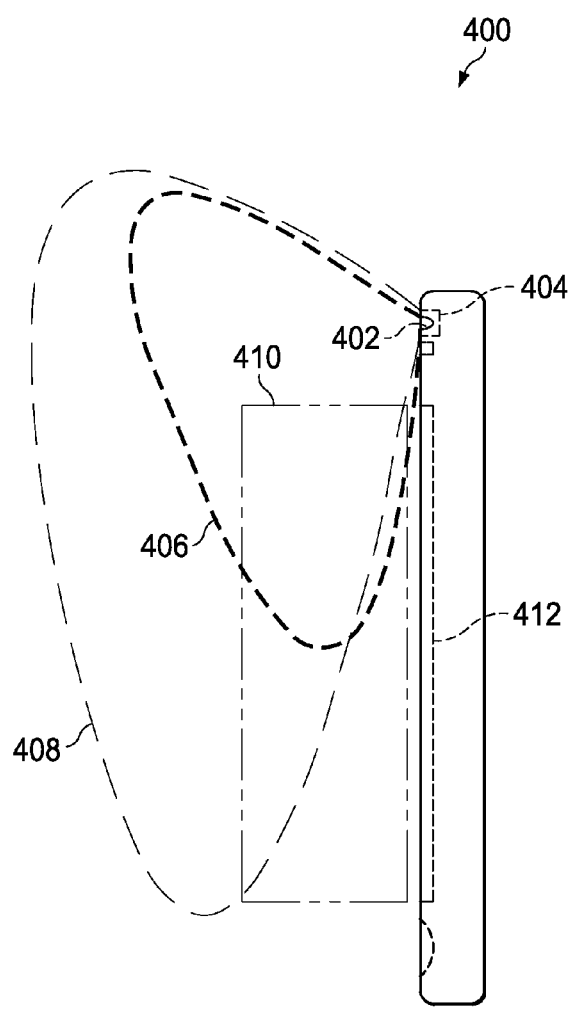

FIG. 4 illustrates a side view of a smartphone comprising a light source and a sensor according to an embodiment of the present disclosure. The components illustrated in FIG. 4 are similar to those in FIG. 1B, FIG. 2, and FIG. 3. Sensor 404 detects light within a field of view 408. Light source 402 emits light within a radiation field 406. In contrast to FIG. 3, FIG. 4 illustrates a system in which both the field of view 408 and the radiation field 406 are tilted toward the screen 412. There may be no need for sensor field of view 408 to encompass a field that is larger than light source radiation field 406. An advantage of system 400 is that sensor field of view 408 and light source radiation field 406 are well aligned and thus the sensitivity of the sensor can be improved and the system may consume less energy, e.g., by not providing illumination to areas that are not covered by the sensor and not providing sensing in areas that are not illuminated by the light source). In addition, sensor field of view 408 and light source radiation field 406 are well aligned with the area over the screen. An advantage of such an alignment with the screen is that it directs sensor field of view 408 and light source radiation field 406 to a location at which a user is likely to perform a gesture. Moreover, this configuration can avoid unnecessarily tracking areas in which a user is unlikely to perform a gesture (e.g., areas that are not over the top of the screen of the device).

Gesture Tracking

A system for detecting a non-contacting hand gesture in a mobile device environment may detect basic gestures (e.g., a user swiping their hand from left to right or whether an object is close to the mobile device). A hand gesture may comprise a user gesturing using their entire (e.g., placed in close proximity to a device and, in some cases, not touching the device with the gesturing hand). A hand gesture may be stored in a memory as a set of coordinates representative of the shape of one or more movements (corresponding to hand movement when performing the gesture). More complex non-contacting gestures may comprise a zoom gesture, a tilt gesture, or a signature gesture. For example, a zoom gesture may comprise a user moving their hand from a first point proximate to a mobile device to a second point, which is closer to the mobile device than the first point. A tilt gesture may comprise a user hovering their hand over mobile device (while not contacting the mobile device) and rotating their hand relative to the mobile device. A signature gesture may comprise a user gesturing the shape of a character. A signature gesture may be stored in a memory as a set of coordinates representative of the shape of one or more alphanumeric characters. For example, a user may gesture, with their index finger, the shape of the letter "C". A sensor for detecting a basic gesture may require fewer resources (e.g., power consumption, lower sampling rate, less computation) than a sensor for detecting more complex non-contacting gestures. While a simple proximity sensor may be used for basic detection (e.g., whether a phone is very close to user's face to turn off the display), a position sensor may be utilized to provide data for complex non-contacting gestures.

An exemplary position sensor may provide position data for a detected object. The position data may comprise a three-dimensional coordinate (e.g., defining angle and distance data) for the position of the object. In an implementation, angle and intensity data are generated, at least in part, by an array of photodetectors (e.g., an array of pairs of photodiodes). The position sensor may be coupled to a processor. For example, the angle may be calculated (e.g., by the processor) based on the amount of light reaching each of a pair of photodiodes through an aperture of the position sensor. The distance may be determined (e.g., by the processor) based, at least in part, on an intensity of the light reflected from a tracked object to the photodiodes of the position sensor. The combination of angle and distance provides a (3D) coordinate of an object and linear tracking capability can enable various advanced hand/finger gesture beyond swiping. The coordinate may be of the form (x, y, i), where x is position in an x axis, y is position in a y axis, and i is an intensity value. The x and y axes may be aligned with a screen of the phone (e.g., where the origin of both axes is a corner of the screen). The intensity value corresponds to how far the object is from the sensor. For example, the intensity value increases as the position of the object moves closer to the position sensor. Conversely, the intensity value decreases as the position of the object moves further away from the position sensor. Thus, in such an example, the intensity value is inversely proportional to the relative distance between the object and the position sensor. A light source may have a maximum radiation distance that defines a distance (e.g., measured relative to the center point of the light source) at which the light emitted from the light source falls below a threshold value. A position sensor may have a maximum illumination distance that defines a maximum distance (e.g., measured relative to the center point of the position sensor) at which an illuminated object can be detected by the sensor. The maximum radiation distance and/or the maximum illumination distance may be utilized to approximate the relative distance between the object and the light source and/or the position sensor. A system for detecting non-contacting hand/finger gestures may utilize output from such a position sensor.

Thumb Gesture

Proximity sensors are often is located at the top of the phone (e.g., as shown in FIG. 1C). Consequently, if a user performs a hand gesture in an area over the proximity sensor the user's hand may obscure a large portion of the screen (e.g., making it hard for the user to view the screen while performing the gesture).

Figure 5:
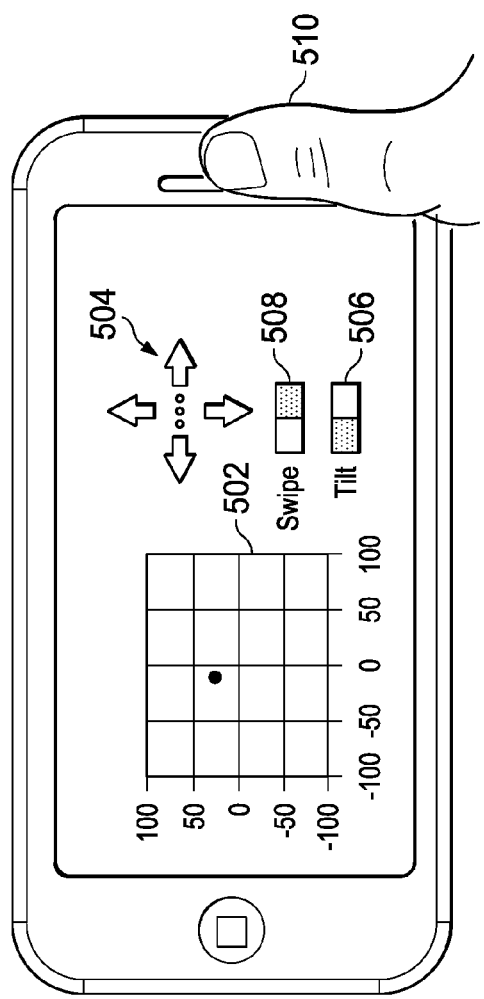
FIG. 5 illustrates operation of mobile device in a mode for detecting thumb gestures.

A solution is to provide a system to detect a thumb gesture that does not require the user to block the screen while providing gesture input. A thumb gesture may comprise a user gesturing using only their thumb (e.g., placed in close proximity to a position sensor). A thumb gesture may be stored in a memory as a set of coordinates representative of the shape of one or more movements (corresponding to thumb movement when performing the gesture). FIG. 5 illustrates a user holding a smartphone in landscape mode and using thumb gestures to control a user interface. The user's thumb is placed over the position sensor and is used to move the circle shape around the grid in the user interface. For example, when the user moves their thumb to the left the gesture system will detect the gesture and move the circle to the left. Thumb gesture may be provided in multiple modes. For example, thumb gesture modes may comprise, e.g., a thumb joystick mode or a thumb mouse mode.

Figure 6:
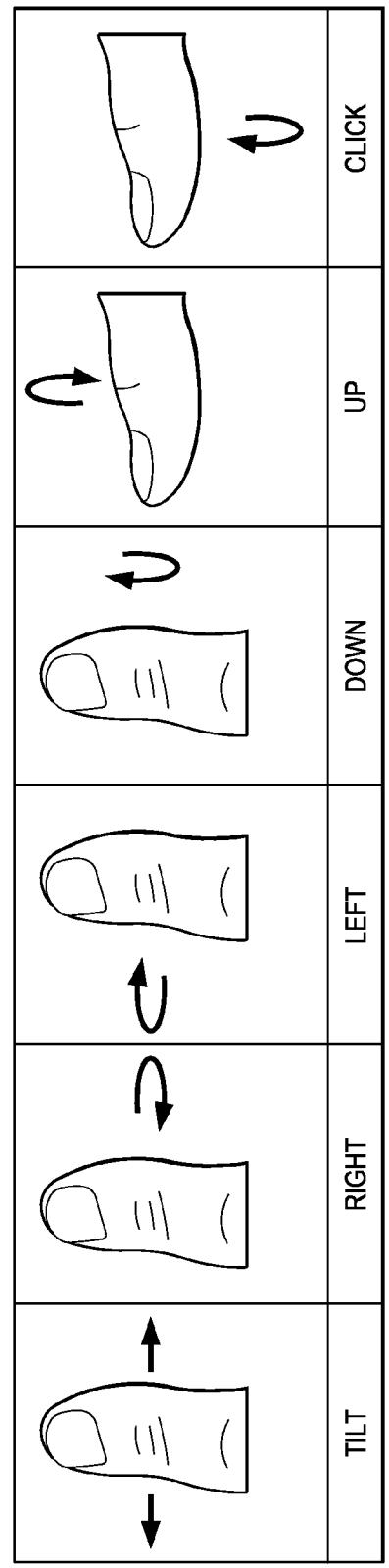
FIG. 6 illustrates an exemplary set of thumb gestures.

For example, FIG. 6 illustrates a set of thumb gestures for a thumb joystick mode, according to an implementation of the present disclosure. The gestures in FIG. 6 include tilt, right, left, down, up, click. For tilt, a user may move their thumb to the left or right from the center position (e.g., to provide corresponding input for moving a "joystick" to the left or to the right). For example, this type of input can be mapped to steering wheel in car racing game. The remaining five gestures (i.e., right, left, down, up, and click) are thumb swipe gestures. A thumb swipe gesture produces gesture data that is different from that produced by a hand swipe gesture due, in part, to the thumb having a limited range a motion. Since a thumb may have a limited range of motion, a system for detecting a thumb gesture may use a sensor(s) (e.g., proximity sensor, position sensor and corresponding light sources) with a reduced range relative to the range needed for hand gestures. The thumb swipe gestures allow a user to user their thumb in a manner analogous to operating a joystick. A right gesture corresponds to a user moving their thumb to the right and then returning to a starting position. A left gesture corresponds to a user moving their thumb to the left and then returning to a starting position. A down gesture corresponds to a user bending their thumb about the knuckle in a downward (e.g., toward a bottom edge of the phone) motion and then returning to a starting position. An up gesture corresponds to a user lifting their thumb in an upward motion and then returning to a starting position. A click gesture corresponds to a user lowering their thumb toward the screen and then returning to a starting position (e.g., as the user may motion when pressing a button with their thumb). For a click gesture (or any other gesture), the user's thumb (or other body part) may (perhaps inadvertently) contact the screen and/or device; advantageously the contact is not required to detect the gesture when using an embodiment of the present disclosure. A position sensor (and a processor coupled thereto) may detect one or more of the thumb gestures based on detecting position data (and/or changes in position data) that correspond to the movements illustrated in FIG. 6.

Returning to FIG. 5, the user is operating in a thumb joystick mode. FIG. 5 illustrates a user interface comprising user interface grid 502, input indicia 504, swipe toggle button 506, tilt toggle button 508, and a user's thumb 510. User interface grid 502 illustrates a current position of a circular shape within the grid. The input indicia 504 provide feedback to the user of the input received based on the gesture. For example, when the system detects that the user swiped to the left, the leftmost arrow may light up indicating to the user that the system detected a left swipe. Swipe toggle button 506 allows a user to toggle on and off the option for inputting thumb swipe gesture (e.g., right, left, down, up, and click shown in FIG. 6). Tilt toggle button 508 allows a user to toggle on and off the tilt mode for thumb tilt gesture (e.g., tilt as shown in FIG. 6).

Figure 7:
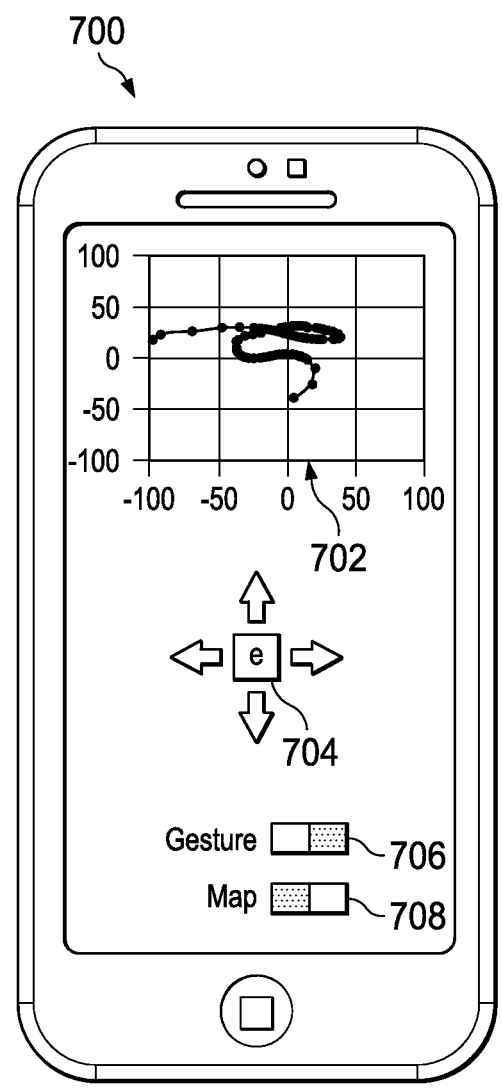
FIG. 7 illustrates, in a user interface, an exemplary result of detecting a shape of an alphanumeric character in position data.

A velocity of the motion of a thumb motion may be estimated based on the variation of intensity signal (e.g., from a position sensor as described above). A tilt gesture may correspond to a velocity that is below a threshold value. A swiping gesture may correspond to a velocity is higher than a threshold value. Thus, a system for detecting gestures according to the present disclosure may use the velocity of a thumb gesture to determine whether a user is providing a tilt gesture or a swipe gesture. Moreover, because a thumb gesture is likely to be input while a mobile device is in landscape mode, detecting whether a user is providing input in a thumb mode may be determined, at least in part, based on the orientation of the device. Alternatively, a user may provide input indicating a mode of gesture input (e.g., thumb gesture, hand gesture, signature gesture). Such an input may be received using user interface controls (e.g., buttons 506 and 508 in FIG. 5 and/or buttons 706 and 708 in FIG. 7).

A thumb mouse mode can continuously track coordinates corresponding to a thumb moved in two-dimensional plane over a position sensor. Thumb mouse mode may be implemented as variation of a thumb joystick mode. For example, in thumb mouse mode a click gesture may be implemented in the same way as is implemented for thumb joystick mode (e.g., click gesture in FIG. 6). In an implementation, when a click gesture is detected, the system may use as a click point (i.e., a point on a screen on which the click is applied) a position at which the thumb was located prior to the thumb velocity increasing to perform the click gesture.

Signature Gesture

In a signature gesture mode according to the present disclosure, a gesture system (e.g., including a position sensor) can recognize a character that a user may gesture in an area above a device (e.g., in an area over the screen of the device or over a position sensor). Such a gesture may be a non-contacting gesture, wherein the user's hand (i.e., the hand performing the gesture) need not contact the device to allow recognition (detection) of the gesture. Instead, the gesture may be performed in the "air" above the device. In an implementation, the gesture system may use the recognition result to activate a user interface function. The user interface function may be to activate an application. In an implementation the application may comprise one of a SMS text application, an application providing listings of other applications, an application for purchasing other applications, a mail (or email) application, a weather application, a web application, a web browser, and/or a calendar application. For example, in a phone 700 illustrated in FIG. 7, a gesture system detected that a user provided a signature gesture in the shape of the letter "e". In this example, a graph 702 renders position data including multiple coordinates. The coordinates of the position data are generally in the shape of the letter "e". In one example, the first five coordinates and the last three coordinates of the positions data in graph 702 may be labeled as noise and/or discarded (as is further discussed below with respect to FIG. 9). Indicia 704 include an output of the letter "e" indicating that the system detected input of a gesture in the shape of the letter "e". Based on the detection of the letter "e" the gesture system may execute an email application. The buttons 706 and 708 are operable to receive input to toggle the mode of gesture input.

Figure 8:
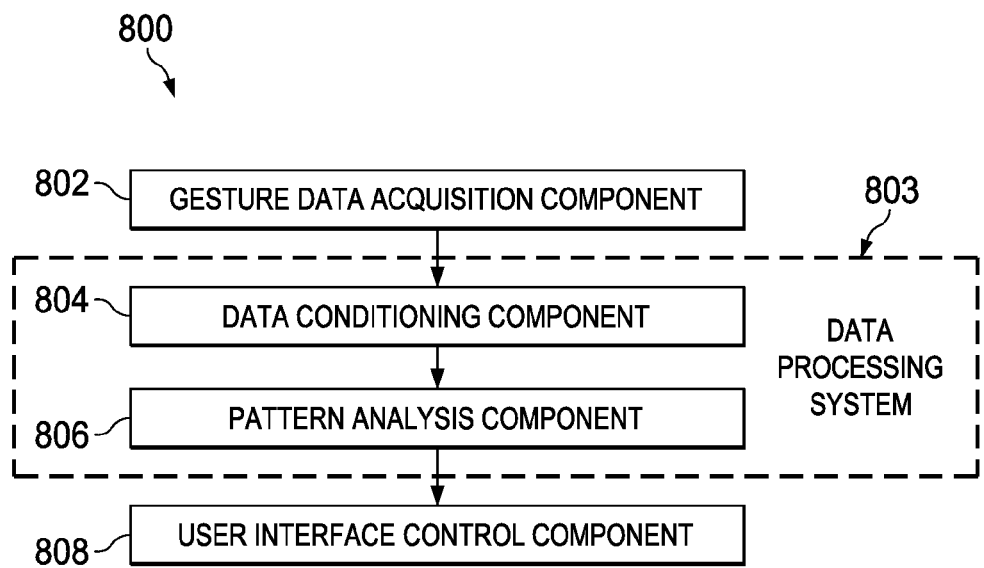
FIGS. 8 and 9 are schematic diagrams illustrating exemplary logic for detect gesture information according to some embodiment of the present disclosure.

FIG. 8 illustrates an implementation of a system for detecting gestures according to the present disclosure. System 800 comprises the following components gesture data acquisition component 802, data processing system 803, data conditioning component 804, pattern analysis component 806, and user interface control component 808. Data processing system 803 comprises the data conditioning component 804 and the pattern analysis component 806.

Gesture data acquisition component 802 may capture data from a position sensor for use in the gesture system. The position sensor may include any one or more of the position sensors described with respect to FIGS. 1A-1C, 2, 3, 4, 5, and 7. For example, gesture data acquisition component 802 may capture data from a linear position sensor for character recognition. Raw data (e.g., position data) from a position sensor may be processed by a processor coupled to the position sensor to produce, in real-time or near-real time, a coordinate (x, y, i), where x is position in an x axis, y is position in a y axis, and i is an intensity value. The intensity value corresponds to how far the object is from the sensor. For example, intensity increases as the object moves closer to the position sensor. Data capture rate is a rate at which the position sensor captures positron data. In an implementation, a data capture rate for the position sensor may be 200 Hz. In another implementation, the data capture rate for the position sensor may be selected from a range of 50 Hz-200 Hz. The data capture rate may be determined based on the behavior of the user (e.g., whether, in the past, the user tended to perform gestures quickly or slowly). If a user tends to, e.g., quickly perform gestures, a data capture rate of 200 Hz may be used to obtain position data every 5 msec. For example, if a user completes a signature gesture in 50 msec, a data capture rate of 200 Hz will provide 10 data points, which can be used to interpretation and/or analyze the data. The data capture rate (or sampling rate) can be reduced down to 50 Hz or lower if the user tends to slowly perform gestures and/or if the system is configured to detect slower gestures. Lower data capture rates can result in lower power consumption for given signal to noise ratio. The data capture rate can be selected based on a user's known gesture speed (or any other target value of gesturing), a desired rate of power consumption, a desired signal to noise ration, or any combination thereof.

Data conditioning component 804 may process gesture data acquired by gesture data acquisition component 802 before the data is analyzed by pattern analysis component 806. The gesture data acquired by gesture data acquisition component 802 are represented as time series of position data, where each point is represented as (x, y, i). Data conditioning component 804 may normalize the position data for processing by pattern analysis. The following is a non-limiting list of exemplary operations that may performed by data conditioning component 804:

1) Time wrapping: Each user may perform a given gesture in a manner that is different from other users. For example, the speed of the gesture, the height above the screen at which a user performs the gesture (intensity) may vary between users, the height above the screen at which a user performs the gesture as the user performs a gesture, or the speed or height may vary for same user performing the same gesture at different points in time. Accordingly, at least a portion of the gesture data may be normalized to fixed target length of time for consistent pattern analysis. The portion of the gesture data to be normalized may correspond to a portion of the gesture data that is determined to contain a gesture. Conversely, The portion of the gesture data to be normalized may correspond to a remaining portion of the gesture data, after redundant or superfluous data is removed from the gesture data.

2) Redundant sample removal: It may not be clear where a beginning and an ending of an intended gesture are located within a stream of gesture data. For example, a user may place their hand within a field of view of a position sensor and may hesitate before performing the gesture. Such hesitation before and/or after a gesture can be modeled and removed by the gesture system. For example, the gesture system may calculate a combined velocity for the gesture data (e.g., average velocity of x, y, and i vector). A subset of the gesture data (e.g., a sample of the gesture data at the beginning and/or at the end of the data) having a combined velocity lower than a threshold may be removed from the gesture data.

3) Intensity weighting: data conditioning component 804 may apply a weight to the gesture data based on a signal to noise ratio of the data and/or sensor. For example, a position sensor (e.g., one providing x, y, i coordinates as described above) may have a signal to noise ratio that increases toward a center of the field of view of the sensor, which also corresponds to a location where the intensity is the highest. In such a case, a gesture system may apply a higher weight to a sample with higher intensity to improve the consistency of pattern analysis.

4) Motion vector extraction: Normalized time series data is separated into a number of segments. For example, the data may be separated into any fixed number of segments that preserves an amount of data for a set of intended gestures that allows the system to detect a gesture within the data. For example, for a complicated pattern (e.g., a pentagram), then the time series data may be separated into 32 segments or higher number of segments. Time series data for signature gestures like 'e' or 't' can be separated into 16 segments, or a lower number of segments. Data conditioning component 804 can then calculate a motion vector for each segment, which may be provided as input to pattern analysis component 806.

Pattern analysis component 806 may use different techniques to analyze gesture data based on the type of gesture data being analyzed. Machine-learning techniques may be used for signature gesture recognition, while analytical techniques may be used for simple gestures or thumb gestures. For example, a neural network (NN) or a hidden Markov model (HMM) can be used to train the system with data collected from a number of people (e.g., people with different styles of writing). A model trained in this way may provide accurate signature recognition for a larger number of potential users. Alternatively, a user may train the model based on their personal signature gesture data. After training, the model can be utilized to provide a ranking of gestures potentially contained in an input gesture sample. For example, a normalized array of gesture data may be input to the trained model; the model may return an array of values (e.g., each value between 0 and 1) corresponding to a degree to which the input array matches a predefined set of signature gesture. Pattern analysis component 806 may output a gesture corresponding to the signature gesture with the highest value (e.g., the best match).

Pattern analysis component 806 may analyze data for a signature gesture using a different approach than is used to analyze data for a basic gesture. A derivative (e.g., calculus derivative) of intensity may be used as a threshold to capture gesture activity. By setting the threshold high, the system can capture gestures that are performed dose to the sensor, such gestures tend to have higher intensity and higher signal to noise ratio. On the other hand, by setting the threshold low, the system can capture gestures that are performed further from to the sensor, such gestures tend to have lower intensity and lower signal to noise ratio. Capturing gesture samples by using two thresholds in parallel allows the system to capture basic gestures in longer range (e.g., further from the sensor) and signature gestures in shorter range (e.g., closer to the sensor).

In addition, pattern analysis component 806 may determine a type of analysis to perform based on a signal to noise ratio of the gesture data. For example, a gesture sample with a low signal to noise ratio may correspond to a basic gesture and, in such an example, the pattern analysis component 806 may only perform basic gesture analysis on the gesture data sample. Detecting signature gestures may utilize a larger number of samples and a number of samples having a higher signal to noise ratio than may be utilized for signature gesture. A gesture sample with a high signal to noise ratio may correspond to a signature gesture and, in such an example, the pattern analysis component 806 may only perform signature gesture analysis on the gesture data sample.

Basic gestures (e.g., swiping and click) may be analyzed using analytical methods and may not require using artificial intelligence (e.g., a neural network or hidden Markov model). However, during a training phase, the basic gestures may be trained in combination with signature gestures. For example, five gestures provided as input for training may be as follows Gesture 1: "e"
Gesture 2: "M"
Gesture 3: "t"
Gesture 4: "a"
Gesture 5: swiping in four directions and click As discussed above, pattern analysis component 806 can analyze data for a signature gesture using a different approach than is used to analyze data for a basic gesture, as previously described (e.g., basic gesture is registered (1) if signal to noise ratio is low, or (2) if the pattern matches stored basic gestures). For example, when the pattern analysis engine analyzes the last gesture (i.e., Gesture 5, which contains 5 basic gestures: a gesture in each of four directions and a click), the x, y, and i vectors are examined to determine which subset of Gesture 5 is left-to-right, right-to-left, top-to-bottom, bottom-to-top, or click a gesture. The pattern analysis engine may parse out the different basic gestures from Gesture 5 and each basic gesture may be stored in a training data set.

User interface control component 808 may utilize a gesture output from pattern analysis component 806 to activate predetermined applications that correspond to the recognized character. In an implementation, only a subset of a set of gestures may be may be enabled for activating applications. For example, the following may be the set of characters are defined and trained: {a, b, c, d, e, g, h, i, k, M, N, o, p, q, s, t, v, w, x}. Only a subset, e.g., five, of defined and trained gestures (e.g., t, a, M, W, C) may be used to activate applications. For example, the letter "t" may correspond a Text SMS, "a" may correspond to an Applications, "M" may correspond to a Mail application, "W" may correspond to a Weather application or a Web application "C" may correspond to a Calendar application. Associations between characters and applications may be stored in a memory or other data storage component.

In an implementation, system 800 may perform a method for detecting a gesture. The method may comprise receiving gesture data, e.g., by gesture data acquisition component 802, processing the gesture data, e.g., by data processing system 803, and outputting a result of the processing to a user interface e.g., user interface control component 808.

Figure 9:
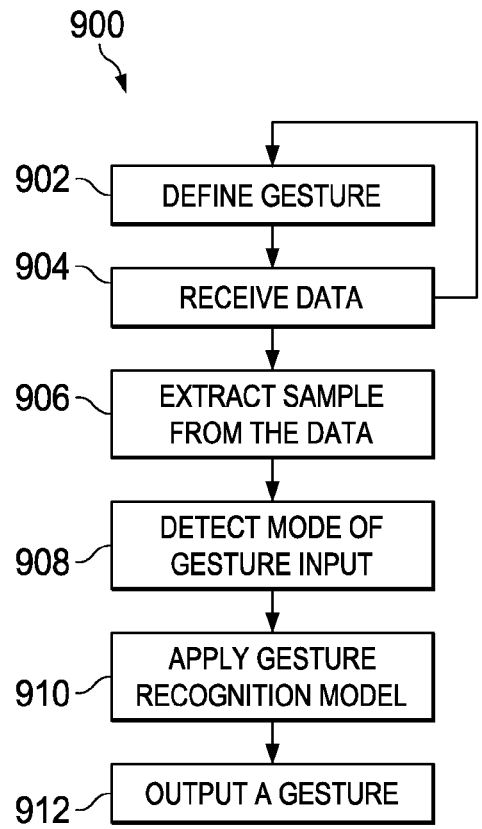

FIG. 9 illustrates a flow diagram for logic to detect gesture information according to an embodiment of the present disclosure. Logic 900 comprises procedures to define gesture 902, received data 904, extract sample from the data 906, detect mode of gesture input 908, apply gesture recognition model 910, output a gesture 912. Logic 900 may be implemented in any of systems 100 through 800.

At procedure 902, logic 900 may receive predefined gestures or may receive a user instruction to define the gesture. In some implementations, logic 900 may provide gesture data from a first user to one or more other users to utilize as training data. In other implementations, gestures defined by a first user are provided to a second user. The defined gesture(s) may be stored in a database of gestures for later use in logic 900. At procedure 904, logic 900 receives gesture data (e.g., position data from a sensor). In an implementation, the data may be received from any of a proximity sensor, a position sensor, a photodiode, a photodetector, or an array of photodiodes. The received gesture data may be used as input to define additional gestures. Thus, procedure 904 may lead to execution of procedure 902.

At procedure 906, a sample is extracted from the data. The extraction may comprise retaining and/or discarding a portion of the data. For example, the received data may include a well-defined swipe gesture and noise (e.g., random data) at an end of the gesture. The extraction may comprise retaining swipe gesture and/or discarding the noise. Alternatively, the extraction may comprise discarding the noise as well as a buffer zone that may comprise a portion of the signal. In another embodiment extraction comprises retaining the well-defined swipe gesture as well as a buffer region that may result in retaining at least a portion of the noise. Detecting where a gesture signal begins and ends may comprise determining at least one of a point at which the signal appears to be random, an energy content of the signal, a velocity of the signal, and/or acceleration of the signal. For example, it may be determined that a gesture signal has ended at a point when the signal appears to be random. In another example, it may be determined back A gesture signal has ended when an energy content of the signal is below as threshold value.

Procedure 908 detects a mode of gesture input. For example, the mode may comprise one of a hand gesture mode, a thumb gesture mode, a signature gesture mode, a thumb joystick mode, or a thumb mouse mode. The mode of gesture input may represent the mode of a device at a point in time when the data was received (e.g. at procedure 904). The mode of gesture input maybe sent by a user for example using a user input button (e.g., buttons 506 and 508 in FIG. 5 and/or buttons 706 and 708 in FIG. 7). Alternatively, the logic may determine the mode of gesture input based on the received data (e.g., the signal to noise ratio of the data) and/or parameters of a device from which the device was received (e.g., the current orientation of the device).

Procedure 910 applies a gesture recognition model. The data input to the gesture recognition model may be any of the received data, the extracted sample, the received data less the extracted sample, or any combination thereof. For example, the gesture model may be a model as described with respect to pattern analysis component 806.

At procedure 912, logic 900 outputs a gesture. The gesture may be output to any of a user, a third-party system, the user interface system, and/or a web server. The gesture may be any data object (or identifier) corresponding to or identifying a defined gesture.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable, processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Throughout the present disclosure, embodiments of a gesture system are described in the context of mobile devices (e.g., mobile phones, smartphones, etc.) for simplicity only; the embodiments are not limited to mobile phones. Embodiments of the present disclosure can be applied to, e.g., portable electronic devices such as, tablets, and MP3 players, and/or consumer electronic devices including home appliances, industrial equipment, and medical devices. In an implementation, the gestures (e.g., hand gestures, thumb gestures, signature gestures) are non-contacting gestures (i.e., gesture that do not require the user to make contact with the device as part of the gesture. For example, instead of touching a screen (i.e., contacting the screen), the user may wave their hand in a predetermined motion over the screen (i.e., a non-contacting gesture) to gesture.

Applications of a gesture system according to the present disclosure may include taking a picture on a mobile phone. For example, in many cases tapping a camera button on a user interface causes the phone to slightly move, resulting in motion blur of the image. A user may utilize a gesture system for detecting non-contact gestures to take a picture without contacting with the phone to do so, thereby prevent the motion blur.

In other applications, a gesture system according to the present disclosure can allows a user to interact with a device using a gloved hand. For example, a user with a gloved hand may include a doctor wearing latex gloves or a user in a cold climate wearing gloves for warmth. If the user attempts to provide input on a touchscreen using the gloved hand, the glove may create a barrier, which prevents the touchscreen from detecting the input. In contrast, a gesture system according to the present disclosure can allow the user to interact with the device using the gloved hand by detecting non-contacting gestures performed by the user using the gloved hand. In other applications, the user may not be using a gloved hand but may want to avoid contacting the device, e.g., because the user has dirty hands and avoids contacting the device to prevent depositing dirt on the device.

Moreover, certain embodiments discussed above can be provisioned in technologies for medical imaging, patient monitoring, medical instrumentation, and home healthcare. This could include pulmonary monitors, heart rate monitors, pacemakers, etc. Other applications can involve automotive technologies for safety systems (e.g., providing user input for stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the present disclosure can be used for auto or user assisted focus and image stabilization (e.g., for digital still cameras, camcorders, etc.). Other consumer applications can include interfaces for home theater systems, DVD recorders, and high-definition televisions. Yet other consumer applications can involve advanced input interfaces (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

The following examples pertain to some embodiments of the disclosure.

Example 1 is an apparatus for detecting gesture information on a user input device, the apparatus comprising a light source for emitting light having a radiation field and/or a radiation volume in which light is emitted, and at least one photodetector for detecting light having a field of view and/or a volume of view in which light is detected, and an aperture for defining the field of view and/or the volume of view.

In example 2, the subject matter of example 1 can optionally include the field of view and/or the volume of view being tilted toward a screen of the user device.

In example 3, the subject matter of example 2 can optionally include the tilting comprising the field of view and/or the volume of view being at an angular offset relative to a line perpendicular to a face of the user input device.

In example 4, the subject matter of any of examples 1-3 can optionally include the radiation field and/or the radiation volume being tilted toward a screen of the user device.

In example 5, the subject matter of example 4 can optionally include the tilting comprises the radiation field and/or the radiation volume being at an angular offset relative to a line perpendicular to a face of the user input device.

In example 6, the subject matter of any of examples 1-5 can optionally include the aperture being offset from a center point of the photodetector.

In example 7, the subject matter of any of examples 1-6 can optionally include the field of view and/or the volume of view having a maximum illumination distance.

In example 8, the subject matter of example 7 can optionally include the radiation field and/or the radiation volume having maximum radiation distance.

In example 9, the subject matter of example 8 can optionally include determining, by a processor, a value of at least one of the maximum illumination distance or the maximum radiation distance based, in part, on a mode of user input.

In example 10, the subject matter of example 9 can optionally include the mode of user input comprises one of a hand gesture mode, a thumb gesture mode, or a signature gesture mode.

In example 11, the subject matter of example 10 can optionally include the thumb gesture mode comprises thumb joystick mode or a thumb mouse mode.

In example 12, the subject matter of example 11 can optionally include the determining, by the processor, the value of at least one of the maximum illumination distance or the maximum radiation distance based, in part, on a mode of user input comprising: determining, by the processor, that the value is higher for a hand gesture mode than for a thumb gesture.

In example 13, the subject matter of any of examples 1-12 can optionally include the at least one photodetector being for detecting light that originates at the light source and is reflected from a surface to the photodetector.

In example 14, the subject matter of any of examples 1-13 can optionally include the light source being a light emitting diode.

In example 15, the subject matter of example 14 can optionally include the light emitting diode being an infrared light emitting diode.

In example 16, the subject matter of any of examples 1-15 can optionally include the at least photodetector comprising at least one photodiode.

In example 17, the subject matter of example 16 can optionally include the at least one photodiode comprising two photodiodes.

In example 18, the subject matter of any of examples 1-17 can optionally include the light source and at least one photodetector being located at a top of a face of the user input device.

In example 19, the subject matter of any of examples 1-18 can optionally include the light source and at least one photodetector being located at a bottom of a face of the user input device.

In example 20, the subject matter of any of examples 1-19 can optionally include the photodetector being configured for detecting a non-contacting gesture.

Example 21 is a method for gesture information on a user input device, the method comprising detecting at least one of a signature gesture, a thumb gesture, or a hand gesture based on processing position data from the user input device.

In example 22, the subject matter of example 21 can optionally include detecting, by the gesture system, a proximity value based on the processing.

In example 23, the subject matter of either of examples 21 or 22 can optionally include the at least one of a signature gesture, a thumb gesture, or a hand gesture being a non-contacting gesture.

In example 24, the subject matter of any of examples 21-23 can optionally include receiving the user input data from a gesture hardware in the user input device.

In example 25, the subject matter of example 24 can optionally include the gesture hardware comprising a light source and a photodetector.

In example 26, the subject matter of any of examples 21-25 can optionally include the light source having a field of view and/or a volume of view and the photodetector having a radiation field and/or a radiation volume.

In example 27, the subject matter of example 26 can optionally include the field of view and/or the volume of view having a maximum illumination distance.

In example 28, the subject matter of either of example 27 can optionally include the radiation field and/or the radiation volume having maximum radiation distance.

In example 29, the subject matter of example 28 can optionally include determined a value of at least one of the maximum illumination distance or the maximum radiation distance based, in part, on a mode of user input.

In example 30, the subject matter of example 29 can optionally include the mode of user input comprises one of a hand gesture mode, a thumb gesture mode, or a signature gesture mode.

In example 31, the subject matter of example 30 can optionally include the thumb gesture mode comprises a thumb joystick mode or a thumb mouse mode.

In example 32, the subject matter of example 31 can optionally include the determining a value of at least one of the maximum illumination distance or the maximum radiation distance based, in part, on a mode of user input comprising: determining that the value is higher for a hand gesture mode than for a thumb gesture.

In example 33, the subject matter of any of examples 21-32 can optionally include the processing comprising analyzing user input data.

In example 34, the subject matter of any of examples 21-33 can optionally include the processing comprising determining a type of analysis to perform based on a type of gesture data being analyzed.

In example 35, the subject matter of any of examples 21-34 optionally include the processing comprising determine a type of analysis to perform based on a signal to noise ratio of the position data.

In example 36, the subject matter of any of examples 21-35 optionally include the processing comprising apply a weight to the position data based on a signal to noise ratio of the position data and/or a signal to noise ratio of a sensor from which the position data was detected.

The invention claimed is:

1. A method comprising:
   detecting position data from a device comprising a light source, a screen, and at least one photodetector mounted on a face of the device, and an aperture defining a field of view of the at least one photodetector, wherein the screen and the aperture are flush with the face of the device, the field of view of the at least one photodetector is fixed and is tilted toward the screen of the device, and the position data is detected based on a non-contacting gesture performed in the field of view of the at least one photodetector; and
   detecting, based on processing the position data, at least one of a signature gesture, a thumb gesture, or a hand gesture.

2. The method of claim 1, further comprising:
   detecting, within the position data, a shape of an alphanumeric character.

3. The method of claim 2, wherein the processing comprises:
   identifying an association between the alphanumeric character and an application; and
   executing the application.

4. The method of claim 1, wherein the processing comprises:
   normalizing the position data to include only data corresponding to a target length of time;

analyzing the normalized position data against defined gestures stored in a data store; and outputting an identifier corresponding to at least one of the defined gestures based on the analyzing.

5. The method of claim 4, wherein the processing comprises:

determining a type of analysis to perform based on a signal to noise ratio of the position data.

6. The method of claim 4, wherein the processing comprises:

determining a type of analysis to perform based on a type of gesture data being analyzed, wherein different types of analysis are determined for each of signature gesture data, thumb gesture data, and hand gesture data.

7. The method of claim 1, wherein the device is a mobile phone.

8. The method of claim 7, wherein the field of view of the at least one photodetector is aligned at an oblique angle relative to a line perpendicular to the face of the mobile phone.

9. The method of claim 1, wherein the light source is flush with the face of the device.

10. A gesture detection apparatus comprising:

a light source, a screen, and at least one photodetector mounted on a face of the gesture detection apparatus, the light source having a radiation field in which light is emitted; the at least one photodetector having a field of view in which light is detected;

an aperture defining the field of view, wherein the screen and the aperture are flush with the face of the gesture detection apparatus, and the aperture aligns the field of view in a direction that is fixed and is tilted toward the screen of the gesture detection apparatus; and at least one processor configured to perform operations comprising:

detecting position data based on a non-contacting gesture performed in the field of view of the at least one photodetector; and detecting, based on processing the position data, at least one of a signature gesture, a thumb gesture, or a hand gesture.

11. The gesture detection apparatus of claim 10, wherein the operations, performed by the at least one processor, further comprise:

detecting, within the position data, a shape of an alphanumeric character.

12. The gesture detection apparatus of claim 11, wherein the operations, performed by the at least one processor, further comprise:

identifying an association between the alphanumeric character and an application; and executing the application.

13. The gesture detection apparatus of claim 10, wherein the operations, performed by the at least one processor, further comprise:

normalizing the position data to include only data corresponding to a target length of time;

analyzing the normalized position data against defined gestures stored in a data store; and outputting an identifier corresponding to at least one of the defined gestures based on the analyzing.

14. The gesture detection apparatus of claim 13, wherein the operations, performed by the at least one processor, further comprise:

determining a type of analysis to perform based on a signal to noise ratio of the position data.

15. The gesture detection apparatus of claim 13, wherein the operations, performed by the at least one processor, further comprise:

determining a type of analysis to perform based on a type of gesture data being analyzed, wherein different types of analysis are determined for each of signature gesture data, thumb gesture data, and hand gesture data.

16. The gesture detection apparatus of claim 10, wherein the gesture detection apparatus is a mobile phone.

17. The gesture detection apparatus of claim 16, wherein the at least one photodetector is aligned at an oblique angle relative to a line perpendicular to the face of the mobile phone.

18. The gesture detection apparatus of claim 10, wherein the light source is flush with the face of the gesture detection apparatus.

* * * * *